US006526192B2

(12) United States Patent
Maroney et al.

(10) Patent No.: US 6,526,192 B2
(45) Date of Patent: Feb. 25, 2003

(54) FIBER FUSE PROTECTION

(75) Inventors: Andrew V Maroney, South Woodford (GB); Vincent Handerek, Grays (GB); Kevin J Cordina, Bishops Stortford (GB)

(73) Assignee: Nortel Networks Limited, St. Laurent (CA)

( * ) Notice: Subject to any disclaimer, the term of this patent is extended or adjusted under 35 U.S.C. 154(b) by 72 days.

(21) Appl. No.: 09/747,690

(22) Filed: Dec. 22, 2000

(65) Prior Publication Data
US 2002/0114554 A1 Aug. 22, 2002

(51) Int. Cl.[7] .............................. G02B 6/26; G02B 6/00
(52) U.S. Cl. ............................ 385/15; 385/27; 385/43; 385/140
(58) Field of Search ............................. 385/15, 27, 39, 385/43, 48, 57, 140

(56) References Cited
PUBLICATIONS

Hand et al., "Single–Mode Tapers As 'Fibre Fuse' Damage Circuit–Breakers", Electronic letters, vol. 24, No. 1, Jan. 5, 1989, pp. 33–34.*

Hand, Single–Mode Tapers As 'Fibre Fuse' Damage Circuit–Breakers, Electronic letters, vol. 25, No. 1, Jan. 5, 1989, pp. 33–34.

* cited by examiner

*Primary Examiner*—Hemang Sanghavi
*Assistant Examiner*—Omar Rojas
(74) *Attorney, Agent, or Firm*—Lee, Mann, Smith, McWilliams, Sweeney & Ohlson

(57) ABSTRACT

An optical component for halting the propagation of a fiber fuse through a transmission fiber has a threshold power level which is greater than the transmission power level of the system for that transmission fiber. The component comprises a fiber which is selected such that it is unable to propagate a fiber fuse when the power is below the threshold power level. The component is designed by selecting values of the core diameter and the higher mode cutoff wavelength of the fiber making up the component. If power surges are experienced which exceed the transmission power level (the transmission fiber being designed to operate at the transmission power levels without fiber fuses being initiated) then the component provide a safety margin.

9 Claims, 5 Drawing Sheets

FIBER FUSE PROTECTION

FIELD OF THE INVENTION

The present invention relates to the phenomenon know as a fiber fuse, and in particular a method of designing components to limit the propagation of fiber fuses.

BACKGROUND OF THE INVENTION

Optical power levels in optical transmission systems are generally increasing. This is due to a number of factors.

For instance, optical transmission systems, optical fibers and other optical devices such as polarisation mode dispersion compensation mechanisms and photonic switches, all have attenuation characteristics. Increasing the power of an optical signal provides a better signal to background noise ratio, and allows the signal to be transmitted longer distances over the optical transmission system before optical amplification is required. Advances in laser technology have ensured that higher powered lasers are now more readily and cheaply available, thus allowing a cost effective implementation of high optical power signal generation.

Typical optical transmission systems simultaneously transmit data using a multitude of different wavelengths, each transmission channel having a separate wavelength of light for transmission of the respective optical signal. Increasingly, channels are becoming more closely packed together with regard to wavelength e.g. DWDM (Dense Wavelength Division Multiplexed) systems. Increasing the number of simultaneous optical transmissions at different wavelengths will increase the average optical power being carried by the transmission system.

Many optical systems utilise optical amplifiers comprising optical fiber. An example of this is a Raman amplifier i.e. an amplifier tat utilises the Raman effect. Optical amplifiers of this type normally use relatively high power pump lasers for providing the optical power that is utilised to amplify the optical signal power. Current trends indicate it is increasingly likely that Raman amplifiers will be is in telecommunications systems.

Experiments have indicated that high optical powers propagating through fibers can induce an effect referred to as a "fiber fuse". The fiber fuse effect, also termed self-propelled self-focusing (SPSF), is a catastrophic damage mechanism. *Electronics letters*, Jan. 7, 1988, Vol. 24, No. 1. pages 47–46 by R Kashyap & K J Blow a *Electronics letters* Jan. 5, 1989, Vol. 25, No. 1, Pages 33–34 by D P Hand & T A Birks describe this phenomena in some detail and describe a fiber fuse damage circuit-breaker, and are incorporated herein by reference.

The fiber fuse effect is believed to be initiated by local heating of the fiber. This can lead to a runway thermal effect which, provided the laser power is sufficient, continues until the fiber core melts. A thermal hock wave is created (visible as a bright spot of side-scattered light) that propagates back along the fiber towards the optical power source. This results in the fiber being permanently damaged and unable to guide light.

Propagation velocity is believed to be of the order of tens of meters per second. A fiber fuse occurring in a telecommunications system could be extremely damaging. Additionally, in systems where optical fiber spans (i.e. typically the length between optical fiber amplifiers) are of the order of 80 kilometers, it will be appreciated that if the fiber fuse is not coined, it has the capacity to damage large lengths of optical fiber. This would require replacement of the damaged fiber. If the fiber fuse is able to propagate into optical processing equipment, such as an amplifier or pump laser, the fiber fuse can result in damage to very expensive network components.

It is therefore desirable to limit the damage caused by fiber fuses. As mentioned above, it has been proposed that the initiation of a fiber fuse results from local heating of the fiber. How is local heating is initiated has not been fully understood, although it has been recognised that a fiber fuse may be initiated at the site of fiber damage, such as a fiber break.

It has been recognised that the propagation of a fiber fuse can be halted by halting the supply of signal power to the fiber, for example by deactivating the laser diodes in the transmitters at the node which acts as the source. It has also been recognised that a beam expander can be used to halt the propagation of the fiber fuse, as described in the article of *Electronics letters* Jan. 5, 1989, reference more fully above.

The fiber fuse effect is also discussed in the assignee's copending U.S. patent application Ser. No. 09/544,362, filed Apr. 6, 2000 entitled "Fuse Protection" which is incorporated herein by way of reference material.

Until now, there has not been a detailed analysis of the conditions under which a fiber fuse will be initiated, nor the condition which permit the propagation of the fiber fuse to be arrested. There is a need for an understanding of these conditions to enable optimum components to be designed which can halt the fiber fuse travel.

SUMMARY OF THE INVENTION

The invention is based on the realisation that a fiber fuse can only be initiated within a fiber when the fiber is carrying power greater than a threshold power. Furthermore, a fiber fuse will not propagate through a fiber (or other component) which has a higher threshold. This threshold power is a function of the fiber characteristics, and this understanding enables components for halting the fiber fuse propagation to be designed, by ensuring that they have a higher power threshold.

Therefore, in a first a aspect, the present invention provides an optical component for use in a transmission system to be positioned within a fiber span for halting the propagation of a fiber fuse along the span, the component comprising a component fiber which is unable to propagate a fiber fuse when the power is below a threshold power level which exceeds the power in the fiber span, the values of the core diameter and the higher mode cutoff wavelength of the component fiber defining the threshold power level.

This component can thus halt any fiber fuse from propagating down the span. The invention is based on the recognition that the threshold power is a function of the core diameter and the higher mode cutoff wavelength of a fiber. For large core diameters, an increase in core diameter increase the threshold power. This is considered to result from reduced "thermal lensing". This is one phenomenon which can be used to explain the propagation of the thermal fuse, and is based on the idea that a local fuse location is imaged to a focal point within the core at an adjacent location, at which a fuse is created. Increasing the core diameter, and therefore the mode field diameter, increases the size of these focal points and thereby reduces the intensity. For small core diameters, it is believed that heat dissipates more readily to the cladding, so that as the core diameter is reduced, the threshold also increases. Thus, the threshold power has a minima value with respect to core diameter (for a fiber of constant cutoff wavelength).

The component may comprise a tapered core fiber, an expanded core fiber or a length of fiber spliced into the transmission fiber. In each case, the characteristics of the component are analysed to provide the desired threshold power level.

According to a second aspect of the invention, there is provided an optical amplifier comprising a rare earth doped fiber, a laser pump source and a coupler for coupling pump light into the doped fiber, wherein an optical component for halting the propagation of a fiber fuse is provided between the pump source and the coupler, the component comprising a component fiber which is unable to propagate a fiber fuse when the power is below a threshold power level which exceeds the power in the rare earth doped fiber, the values of the core diameter and the higher mode cutoff wavelength of the component fiber defining the threshold power level.

This aspect enables protection of the laser pump source of a rare earth doped amplifier, such as an Erbium amplifier.

According to a third aspect of the invention, there is provided an optical network comprising a length of transmission fiber and a Raman pump source providing Raman amplification, a coupler being provided for coupling the output signal from the Raman pump sources to the transmission fiber, wherein an optical component for halting the propagation of a fiber fuse is provided between the Raman pump source and the coupler, the component comprising a component fiber is unable to propagate a fiber fuse when the power is below a threshold power level which exceeds the power in the transmission fiber, the values of the core diameter and the higher mode cutoff wavelength of the component fiber defining the threshold power level.

This aspect enables protection of the laser pump source of a distributed Raman amplifier.

According to a fourth aspect of the invention, there is provided a node for an optical network, comprising an optical transmitter for providing a signal at a specific wavelength onto a transmission fiber, wherein an optical component for halting the propagation of a fiber file is provided between the transmitter and transmission fiber, the component comprising a component fiber which is unable to propagate a fiber fuse when the power is below a threshold power level which exceeds the power in the transmission fiber, the values of the core diameter and the higher mode cutoff wavelength of the component fiber defining the threshold power level.

This aspect enables protection of the laser diodes in the transmitter of a mode.

According to a fifth aspect of the invention, there is provided a method of selecting an optical component for halting the propagation of a fiber fuse through a transmission fiber, comprising:

determining an expected power level within the transmission fiber;

selecting a threshold power level which is greater than the power level;

selecting a component fiber which is unable to propagate a fiber fuse when the power is below the threshold power level, the core diameter and the higher mode cutoff wavelength of the component fiber being selected to define the threshold power level.

This design method provides a component which has a threshold power level which exceeds the maximum power to be transmitted in the system. If power surges are experienced which exceed the expected transmission power levels (the transmission fiber being designed to operate at the transmission power levels without fiber fuses being initiated) then the components provide a safety margin.

BRIEF DESCRIPTION OF DRAWINGS

Examples of the invention will now be described in detail with reference to the accompanying drawings, in which.

DETAILED DESCRIPTION OF PREFERRED EMBODIMENTS

The invention is based on prolonged studies of the fiber fuse effect, and some significant findings of these studies will first be given, to enable the invention to be understood more fully.

Figure 1:
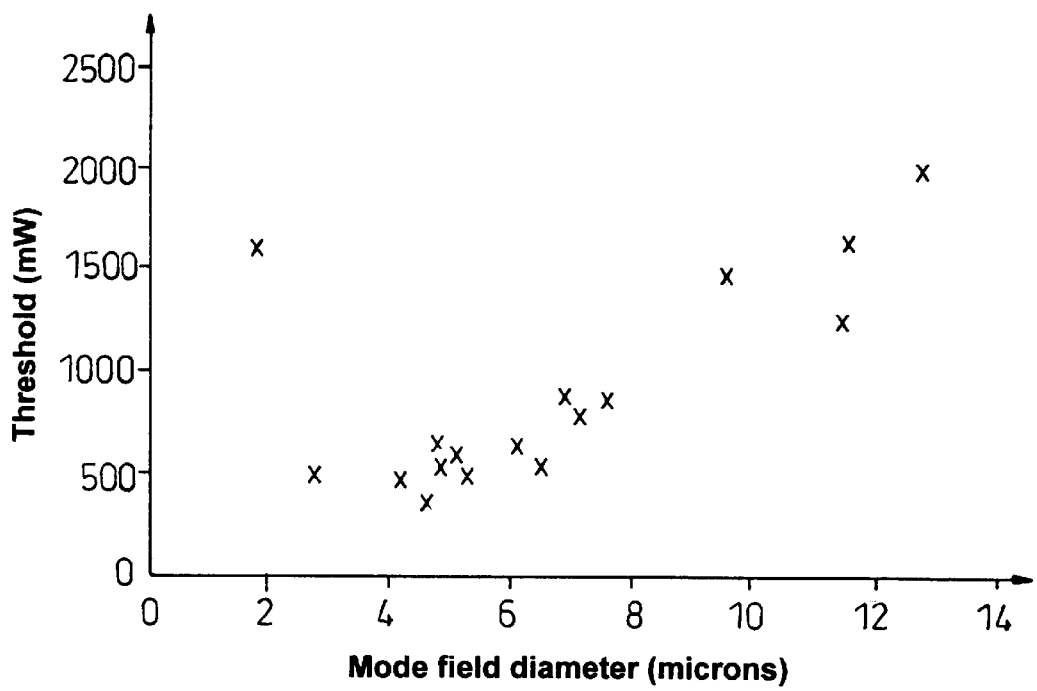
FIG. 1 shows experimental results which show the minimum signal powers at which a fiber fuse can be initiated for different fibers.

FIG. 1 shows experimental results which show the minimum signal powers which were carried by different optical fibers when a fiber fuse could be initiated. Different techniques were employed to trigger the fiber fuse, for example including exposing broken or cleaved fiber ends to heat absorbers (thereby promoting localised heating).

FIG. 1 plots the fiber mode field diameter against the minimum power at which a fuse can be initiated, hereinafter referred to as the "threshold power". The results shown in FIG. 1 are based on experimentation and suggest that there is a linear dependence of the threshold power on the mode field (MFD) of the radiation within the fiber for an MFD greater than 4 microns. Also, there is an absolute minimum power required for fuse behaviour, below which even the most susceptible fiber does not exhibit the effect. This is close to 375 mW. This minimum power seems to be required in order to create an area of local absorption within the fiber via heating to the point of thermal runaway. At very small MFD the threshold rises again, possibly because the small core sizes involved make generating thermal effects more difficult.

It has also been found, by separate experimentation, that the fuse triggering threshold is also the threshold at which the fuse will terminate as the power is gradually reduced. Additionally the likelihood of triggering a fuse depends strongly on the extra power above threshold in the fiber, and spontaneous fuses can be generated from poor quality cleaves at high enough powers.

FIG. 1 shows that above an MFD of four microns the fuse threshold varies approximately linearly with MFD. This allows prediction of the fuse power thresholds for most fibers. An empirical model was developed to predict the fuse threshold power $P_{th}$ of a fiber given its higher mode cut-off wavelength, core diameter and the operating wavelength. Within the region displaying the linear trend with MFD, the fuse threshold is approximated by equation (1):

$$P_{th} = \phi\left(\frac{\varphi}{\varphi_c}\right)(105 + 5.869\phi)\,mW \quad (1)$$

where ϕ is the core diameter in microns and Φ and $\Phi_c$ are the mode field diameters respectively at the operating wavelength λ and at the higher mode cutoff wavelength, $\lambda_c$. The mode field diameter can be approximated (in known manner) by:

$$\varphi = \phi\left(0.65 + 3.894\left(\frac{\lambda_c}{\lambda}\right)^{\frac{3}{2}} + 6.924\left(\frac{\lambda_c}{\lambda}\right)^{-6}\right) \quad (2)$$

The mode field diameter is thus a function of the core diameter and the cutoff wavelength. Likewise, the threshold power is also a function of the core diameter and cutoff wavelength in the linear region.

Equation (1) suggests that the fuse threshold scales approximately linearly with core diameter, with a correction factor related to the variation of mode field diameter with normalised frequency. The predicted fuse threshold has been found to be accurate for all quasi-step index fibers tested, provided that they remain single mode. The formula is not accurate for other fiber designs.

At small mode field diameters, the model uses equation (3) below. As the MFD approaches zero, the threshold intensity suggested by the model approaches the intrinsic damage threshold of silica.

$$P_{th} = 7.59 \times 10^3 e^{-1.07\Phi}\,mW \quad (3)$$

In the low MFD region, the threshold power is again a function of the core diameter and cutoff wavelength. Thus, the threshold power in for all mode filed diameter values is a function of the core diameter and cutoff wavelength.

Figure 2:
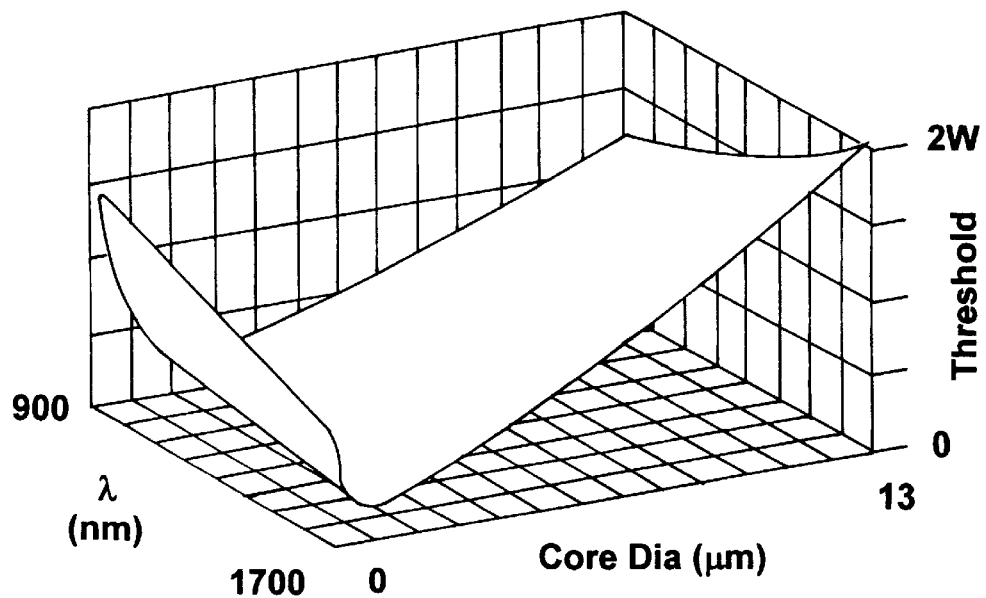
FIG. 2 shows an example of threshold variation with wavelength and core diameter for a given higher mode cut-off wavelength.

FIG. 2 shows an example of threshold variation with wavelength and core diameter for a given higher mode cut-off wavelength, using both expressions (1) and (3). The fiber fuse threshold is a function of the wavelength of the signals transmitted in the fiber, and the threshold power is the power of signals at that wavelength below which a fiber fuse cannot be initiated.

The ability to predict the fiber fuse threshold with a knowledge of the basic characteristics of a fiber enables protection devices to be designed using fibers which demonstrate increased fiber fuse threshold, and which therefore can halt the propagation of a fiber fuse. These protection devices can then be positioned at locations within a network to protect expensive network components from fiber fuse damage. In order to design a protection component, fiber characteristics are selected to provide a different mode field diameter, thereby increasing the fiber fuse power threshold.

Figure 3A:
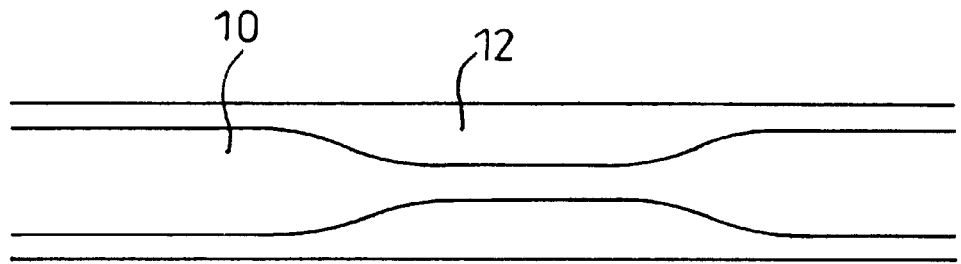
FIGS. 3a–3c show three designs of protection device according to the invention.
Figure 3B:
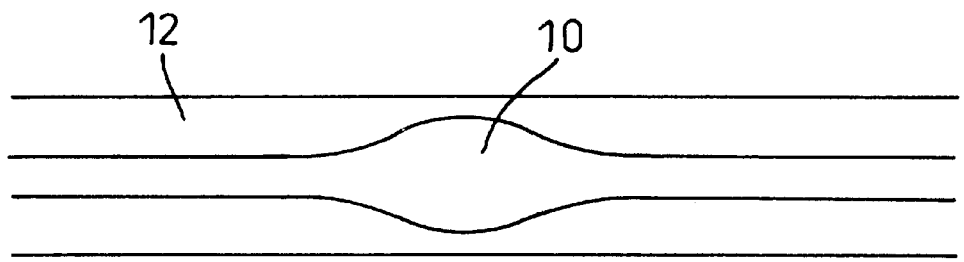
Figure 3C:
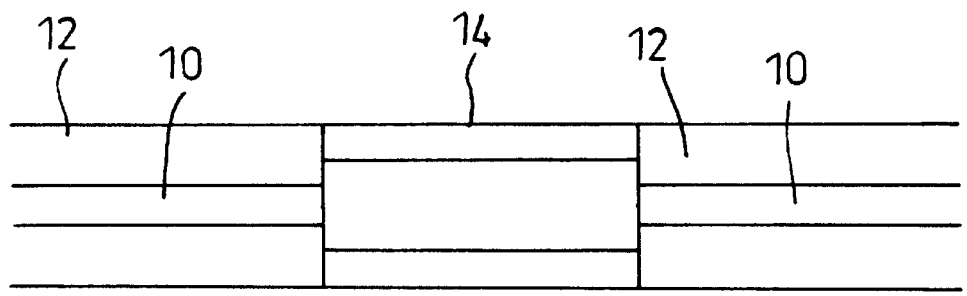

FIG. 3 shows three examples of possible fiber fuse protection components. In FIG. 3, the fiber comprises a core 10 and a cladding 12. FIG. 3A shows a tapered core fiber, FIG. 3B shows an expanded core fiber and FIG. 3C shows a section of fiber 14 of different characteristics (for example different core diameter) spliced into the transmission fiber.

The tapered core design of FIG. 3A provides a change in core diameter, as well as a change in the cutoff wavelength. The change in cutoff wavelength means that along the length of the taper, a different graph provides the power threshold value. This is because the graph of FIG. 2 is for one cutoff wavelength only. The net result is that the power threshold increases along the taper.

The expanded core design of FIG. 3B provides an increase in core diameter, and accompanied by a change of refractive index of the core. Again, this changes the cutoff wavelength, but again the net result is that the power threshold increases at the expanded part of the core.

The splice design of FIG. 3C simply introduces a different fiber types, which results in a step change in the threshold power.

Figure 4:
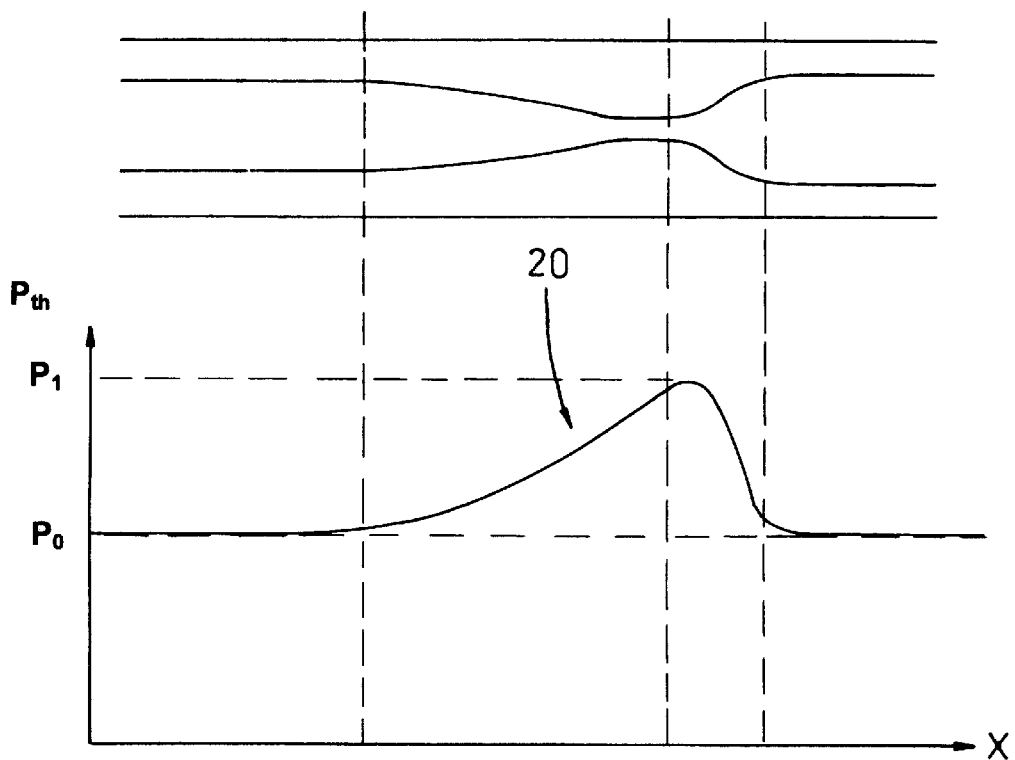
FIG. 4 shows the relationship between the fiber power threshold $P_{th}$ and distance x for the protection device of FIG. 3A.

The tapered core design is at present preferred. The splice design introduces significant losses and reflection of signals. FIG. 4 shows schematically how the taper alters the power threshold. The analysis of effect of the taper on the power threshold is a routine matter, and simply involves analysing the fiber characteristics (core diameter, cladding diameter, refractive indices and profile at discrete points along the taper). The analysis of the effect of the expanded core and splice designs is equally a routine matter for those skilled in the art, once the relationship between the fiber fuse power threshold and the fiber characteristics has been determined.

FIG. 4 shows the relationship between the fiber fuse power threshold $P_{th}$ and distance x along the tapered fiber section. As the taper narrows, the threshold increases as shown at 20. The base level $P_0$ is the expected transmission power level within the transmission fiber. This is a function of the number of channels, the power per channel, and additional power resulting from distributed Raman amplification.

The protection component is designed by selecting a threshold power level $P_1$ which is greater than the transmission power level $P_0$, and designing the tapered fiber which is unable to propagate a fiber fuse when the signal power is below the threshold power level $P_1$. Thus, the tapered fiber section has a peak threshold of $P_1$ as shown in FIG. 4. The tapered fiber is designed by selecting values of the core diameter and the higher mode cutoff wavelength along the taper in order to achieve the profile of FIG. 4.

The difference between the power levels $P_0$ and $P_1$ provides a margin by which the power levels in the network can surge above the expected power level $P_0$, and with protection of the main components of the network against fiber fuse damage.

It is generally desirable for fibers within the network to have low mode field diameters, and therefore the fibers for the network will typically have fiber fuse threshold close to the operating power level $P_0$. Low mode filed diameter fiber is desirable when distributed Raman amplification is being used. Protection devices may be needed in the event of power surges which may be unavoidable in the event of high traffic flow.

Figure 5:
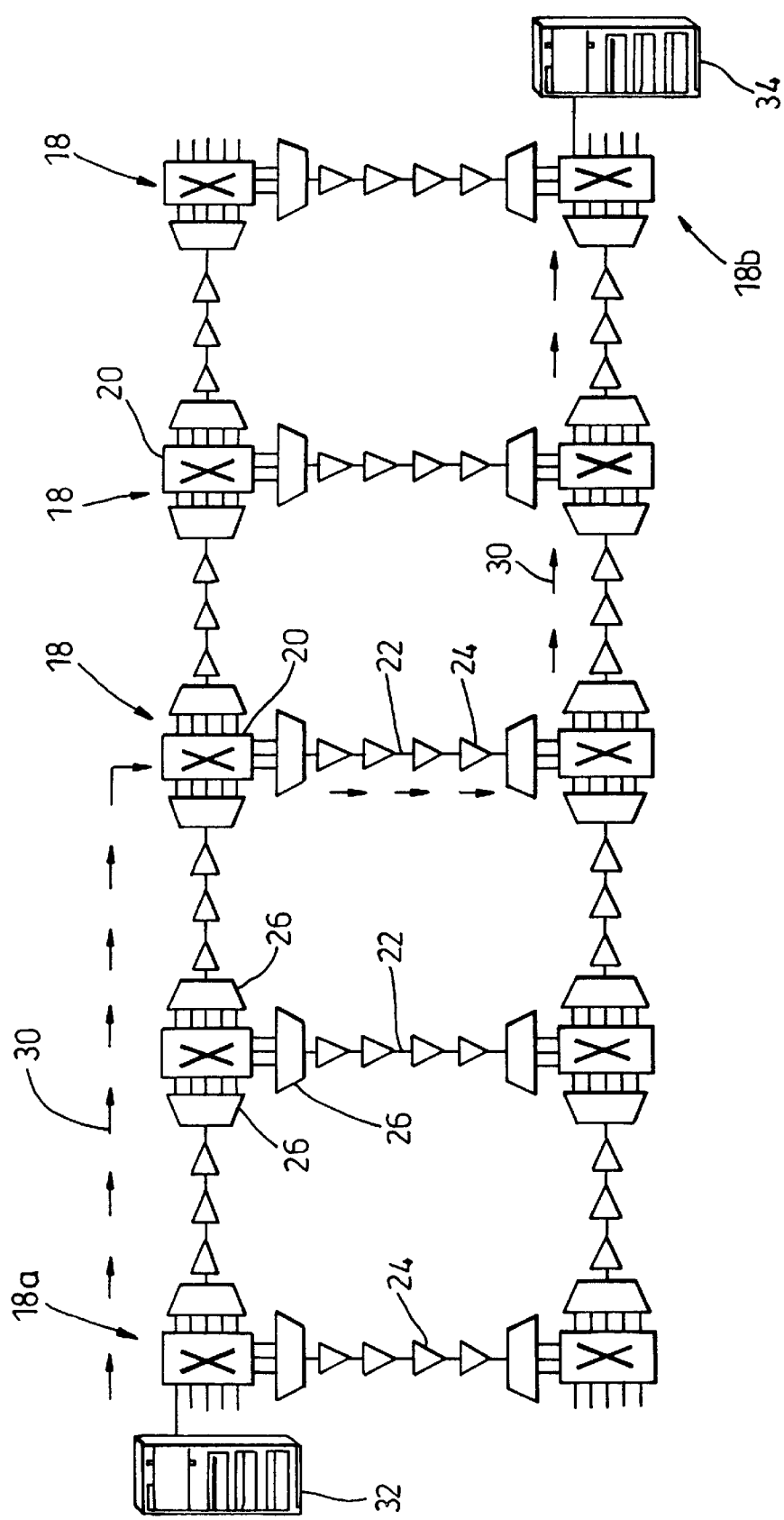
FIG. 5 shows a network in which the protection devices of the invention may be used.

FIG. 5 shows a WDM optical communications network comprising a plurality of interconnected nodes 18, each node comprising an optical switching arrange 20 for performing routing of signals across the network. The nodes are connected together by optical fibers 22 along which optical amplifiers 24 are placed. The fibers 22 carry WDM optical signals, and each node comprises a multiplexing/demultiplexing units 26 which provide the channels of the WDM system on individual fibers to the switching arrangement 20. The switching arrangement may switch individual channels, bands of channels, all channels or the entire fiber signal.

The arrows 30 indicate one possible connection through the network enabling equipment 32 at a source node 18a to communicate with equipment 34 at a destination node 18b.

The equipment 32, 34 is any device which provides optical signals for transmission over the network or which is provided for receiving signals from the network.

The fiber fuse protection devices will be arranged within the network at positions to protect the expensive equipment.

Figure 6:
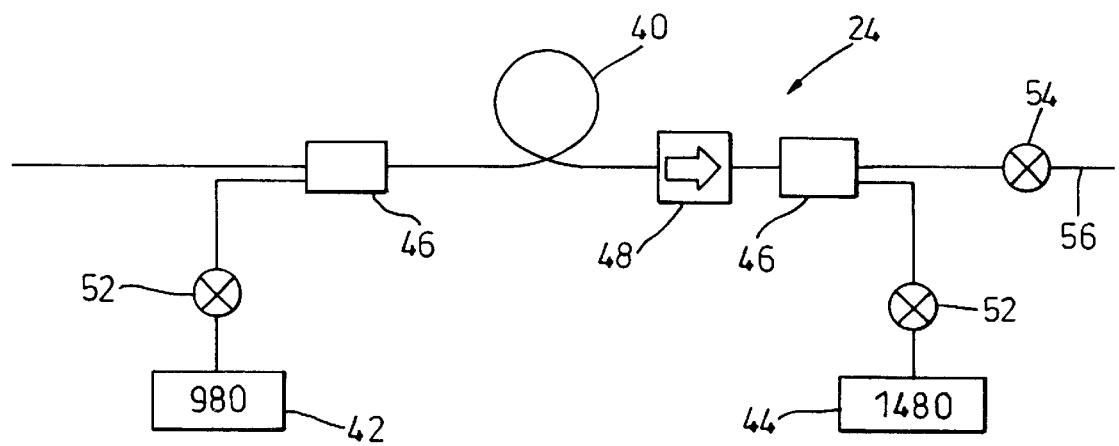
FIG. 6 shows an amplifier of the network of FIG. 5 in more detail.

As one example, FIG. 6 shows one amplifier 24 comprising a rare earth doped fiber 40, a laser pump source 42 for co-pumping at 980 nm, a laser pump source 44 for counter pumping at 1480 nm and couplers 46 for coupling pump light into the doped fiber. The amplifier also comprises an isolator 48. Of course, many other amplifier configurations are possible, for example with only one pump source for co- or counter-pumping.

A fiber fuse protector for halting the propagation of a fiber fuse is provided between the pump sources and the couplers, at locations 52 shown in FIG. 6. These protectors prevent a fiber fuse propagating back to the laser pump sources 42,44. The output of the amplifier may also be provided with a protection device at location 54 to protect the Erbium doped fiber from a fiber fuse propagating backwards within the transmission fiber 56.

Figure 7:
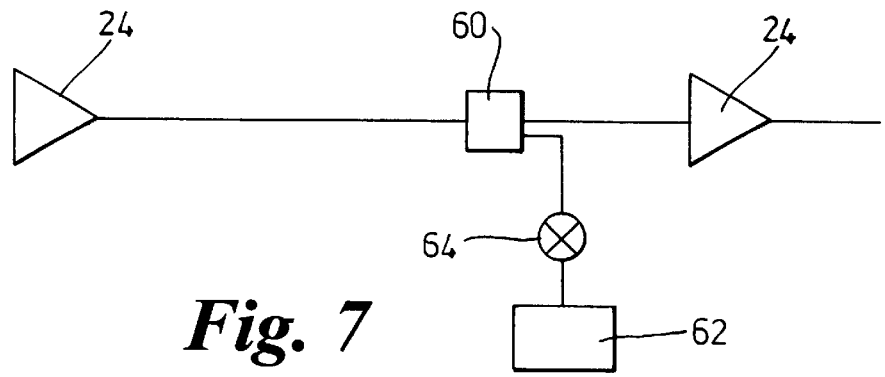
FIG. 7 shows distributed Raman amplification which can be employed in the network of FIG. 5.

Although not shown in FIG. 5, the fiber spans within the network can be provided with Raman pump sources providing distributed Raman amplification. As shown in FIG. 7, a coupler 60 is provided in the span between amplifiers 24 for coupling the signal from a Raman pump source 62 to the transmission fiber. A protection component for halting the propagation of a fiber fuse is provided between the Raman pump source 62 and the coupler 60 at location 64. This protection device protects the high power Raman pump source 62 from fiber fuse damage.

Figure 8:
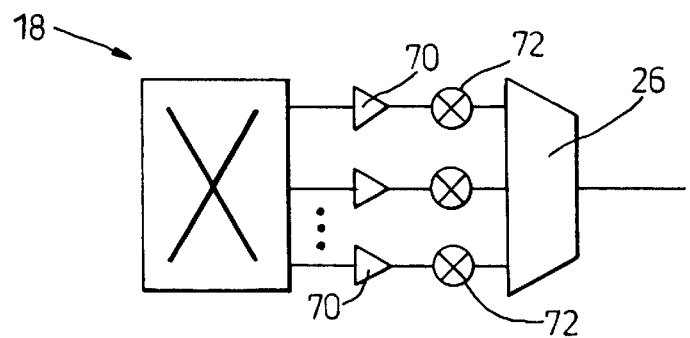
FIG. 8 shows a node of the network of FIG. 5 in more detail.

As shown in FIG. 8, each node 18 comprises an optical transmitter 70 for each WDM channel. The outputs are supplied to the multiplexer 26. The output of each transmitter 70 may also be provided with a protection device between the transmitter and transmission fiber, at locations 72.

The positions of the protection devices described above provide protection of the expensive parts of the network, such as the pump sources, transmitters and amplification fiber.

What is claimed is:

1. An optical component for use in a transmission system to be positioned within a fiber span for halting the propagation of a fiber fuse along the span, the component comprising a component fiber which is unable to propagate a fiber fuse when the power is below a threshold power level which exceeds the power in the fiber span, the values of the core diameter and the higher mode cutoff wavelength of the component fiber being selected to define the threshold power level.

2. An optical amplifier comprising a rare earth doped fiber, a laser pump source and a coupler for coupling pump light into the doped fiber, wherein an optical component for halting the propagation of a fiber fuse is provided between the pump source and the coupler, the component comprising a component fiber which is unable to propagate a fiber fuse when the power is below a threshold power level which exceeds the power in the rare earth doped fiber, the values of the core diameter and the higher mode cutoff wavelength of the component fiber being selected to define the threshold power level.

3. An optical network comprising a length of transmission fiber and a Raman pump source providing Raman amplification, a coupler being provided for coupling the output signal from the Raman pump sources to the transmission fiber, wherein an optical component for halting the propagation of a fiber fuse is provided between the Raman pump source and the coupler, the component comprising a component fiber which is unable to propagate a fiber fuse when the power is below a threshold power level which exceeds the power in the transmission fiber, the values of the core diameter and the higher mode cutoff wavelength of the component fiber being selected to define the threshold power level.

4. A node for an optical network, comprising an optical transmitter for providing a signal at a specific wavelength onto a transmission fiber, wherein an optical component for halting the propagation of a fiber fuse is provided between the transmitter and transmission fiber, the component comprising a component fiber which is unable to propagate a fiber fuse when the power is below a threshold power level which exceeds the power in the transmission fiber, the values of the core diameter and the higher mode cutoff wavelength of the component fiber being selected to define the threshold power level.

5. A method of selecting an optical component for halting the propagation of a fiber fuse through a transmission fiber, comprising:

determining an expected power level within transmission fiber;

selecting a threshold power level which is greater than the power level;

selecting a component fiber which is unable to propagate a fiber fuse when the power is below the threshold power level, the core diameter and the higher mode cutoff wavelength of the component fiber being selected to define the threshold power level.

6. A method according to claim 5, wherein the component comprises a tapered core fiber.

7. A method according to claim 5, wherein the component comprises an expanded core fiber.

8. A method according to claim 5, wherein the component comprises a length of fiber spliced into the transmission fiber.

9. An optical component for halting the propagation of a fiber fuse through a transmission fiber selected using the method of claim 5.

* * * * *